(No Model.)
D. FISCHBECK.
FLY NET FOR HORSES.
No. 297,121. Patented Apr. 22, 1884.
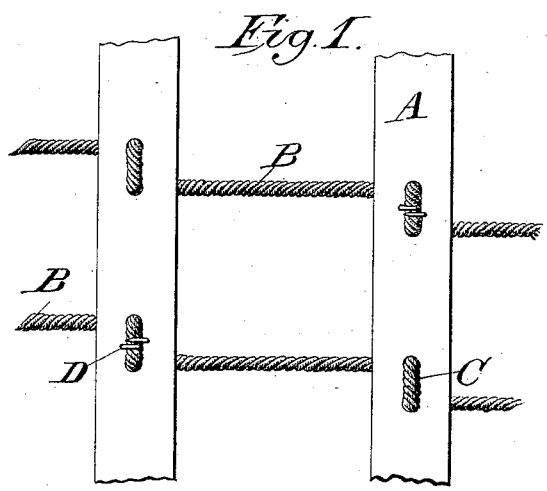
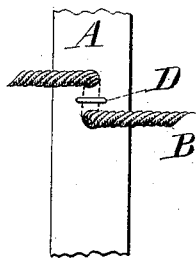 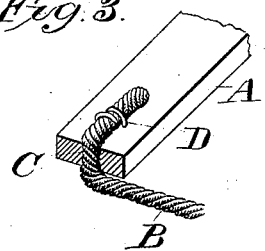 
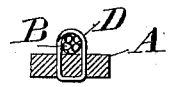
Witnesses:
Inventor:

UNITED STATES PATENT OFFICE.

DETMER FISCHBECK, OF MILWAUKEE, WISCONSIN.

FLY-NET FOR HORSES.

SPECIFICATION forming part of Letters Patent No. 297,121, dated April 22, 1884.

Application filed April 3, 1882. (No model.)

*To all whom it may concern:*

Be it known that I, DETMER FISCHBECK, a citizen of the United States, residing at Milwaukee, in the county of Milwaukee and State of Wisconsin, have invented certain new and useful Improvements in Fly-Nets for Horses; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in fly-nets for horses, and pertains to that class of nets having longitudinally-arranged bars or straps adapted to extend lengthwise of the horse and transversely arranged strings of cords adapted to lie across the horse from one side to the other, which cords are secured to said bars in perforations, as hereinafter shown.

The object of my improvement is to provide a device for securing the cords in the perforations of the bars at a fixed point and prevent the bars slipping upon the cords.

My invention is further explained by reference to the accompanying drawings, in which—

Figure 1 represents a detail of my net from the outside. Fig. 2 is a part of one of the bars, showing the perforations. Fig. 3 is a detail part in section and part in perspective. Fig. 4 represents one of the staples. Fig. 5 is a cross-section of one of the bars.

Like parts are represented by the same reference-letters in all the views.

A represents the longitudinally-arranged bars of the net. B are the strings. C are the perforations. The perforations C are preferably formed in line with the bars, as shown, but, if desired, may be formed in line with the cross-pieces or strings. The strings or cross-pieces B are preferably made of cords; but leather strings may be substituted therefor. The cords are secured to the bars by passing them upward and down through the perforations, as shown, leaving the loops of the cord upon the upper sides of the bar. The net being thus formed in the ordinary manner, the cords are secured at a fixed point in the perforation of the bars, and prevented from slipping by the staples D, which staples are driven through the bars midway between the perforations, preferably from their under sides, and their respective arms clinched over and driven firmly upon the loop of the cord, as shown. It is obvious, however, that, if desired, the loops of the staples may be placed over the loops of the cords, and the arms of the staples clinched below. The form shown is, however, preferred, as there is no danger of the points of the staples chafing the horse. It is usual to thus fasten the cords at each crossing upon the central bar of the net, so that the cords cannot be drawn toward one side of the animal; but it is sufficient to use the staple at each alternate crossing of the cords upon the side bars.

Having thus described my invention, I make no claim to the manner of interlacing the cords through the perforations of the longitudinally-arranged bars, as shown in Patent No. 20,235 or in my previous patent, No. 227,353; nor to the manner of attaching the cords to the flat surface of unperforated bars, as shown in Patent No. 214,190, as I am aware that nets thus formed are not new.

What I claim as new, and desire to secure by Letters Patent, is—

In that class of fly-nets in which the cords are secured to transversely-arranged bars in perforations, the combination, with such bars and cords, of the U-shaped staples inserted through said bars from their lower surface, and having their respective arms extending above and around the looped portion of said cords between the perforations above the upper surface of the bars as adapted to prevent the cords from slipping in the perforations or the bars from slipping upon the cords, substantially as and for the purpose specified.

In testimony whereof I affix my signature in presence of two witnesses.

DETMER FISCHBECK.

Witnesses:
E. G. ASMUS,
JAS. B. ERWIN.